(12) United States Patent
Yegin et al.

(10) Patent No.: US 7,609,216 B2
(45) Date of Patent: Oct. 27, 2009

(54) VEHICLE MIRROR HOUSING ANTENNA ASSEMBLY

(75) Inventors: Korkut Yegin, Grand Blanc, MI (US); Daniel G. Morris, Ovid, MI (US); Brett W. Harris, Lapeer, MI (US); William R. Livengood, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 50 days.

(21) Appl. No.: 11/374,303

(22) Filed: Jan. 12, 2007

(65) Prior Publication Data

US 2008/0001834 A1    Jan. 3, 2008

Related U.S. Application Data

(63) Continuation of application No. 10/903,041, filed on Jul. 30, 2004, now Pat. No. 7,248,225.

(51) Int. Cl.
  *H01Q 1/32* (2006.01)
(52) U.S. Cl. .................. 343/713; 343/711; 343/712; 343/700 MS
(58) Field of Classification Search ................ 343/711, 343/713
  See application file for complete search history.

(56) References Cited

U.S. PATENT DOCUMENTS

| | | | |
|---|---|---|---|
| 5,798,882 A | 8/1998 | Lang | |
| 5,892,661 A | 4/1999 | Stafford et al. | |
| 6,061,029 A | 5/2000 | Hisada | |
| 6,217,181 B1 | 4/2001 | Lynam et al. | |
| 6,259,412 B1 | 7/2001 | Duroux | |
| 6,380,902 B2 | 4/2002 | Duroux | |
| 6,396,446 B1 | 5/2002 | Walstra et al. | |
| 6,431,712 B1 | 8/2002 | Turnbull | |
| 6,525,693 B2 | 2/2003 | Ugge | |
| 6,690,329 B2* | 2/2004 | Kodama | 343/713 |
| 6,697,024 B2 | 2/2004 | Fuerst et al. | |
| 2001/0015862 A1 | 8/2001 | Lynam et al. | |
| 2002/0159774 A1 | 10/2002 | Koyama et al. | |
| 2003/0128131 A1 | 7/2003 | Skiver et al. | |

FOREIGN PATENT DOCUMENTS

DE       19630070       1/1998

\* cited by examiner

*Primary Examiner*—Trinh V Dinh
(74) *Attorney, Agent, or Firm*—Jimmy L. Funke

(57) ABSTRACT

An antenna assembly is disclosed. The antenna assembly includes an externally-located vehicular mirror housing and an antenna assembly. The externally-located vehicular mirror housing includes a cable exit passage. The antenna assembly includes at least one antenna element mounted on a circuit board. The antenna assembly is located within the externally-located vehicular mirror housing. The cable exit passage passes an antenna cable extending from the circuit board and into the vehicle cabin.

14 Claims, 6 Drawing Sheets

VEHICLE MIRROR HOUSING ANTENNA ASSEMBLY

This application is a continuation application of U.S. Ser. No. 10/903,041, filed Jul. 30, 2004, now U.S. Pat. No. 7,248,225 B2, issued 24 Jul. 2007.

TECHNICAL FIELD

The present invention generally relates to antenna assemblies and, more particularly, to a mirror housing antenna assembly.

BACKGROUND OF THE INVENTION

Automotive vehicles are commonly equipped with audio radios that receive and process signals relating to amplitude modulation/frequency modulation (AM/FM) antennas, satellite digital audio radio systems (SDARS) antennas, global positioning system (GPS) antennas, digital audio broadcast (DAB) antennas, dual-band personal communication systems digital/analog mobile phone service (PCS/AMPS) antennas, Remote Keyless Entry (RKE), Tire Pressure Monitoring System (TPM) antennas, and other wireless systems.

SDARS, for example, offer digital radio service covering a large geographic area, such as North America. Satellite-based digital audio radio services generally employ either geo-stationary orbit satellites or highly elliptical orbit satellites that receive uplinked programming, which, in turn, is rebroadcasted directly to digital radios in vehicles on the ground that subscribe to the service. SDARS also use terrestrial repeater networks via ground-based towers using different modulation and transmission techniques in urban areas to supplement the availability of satellite broadcasting service by terrestrially broadcasting the same information. The reception of signals from ground-based broadcast stations is termed as terrestrial coverage. Hence, an SDARS antenna is required to have satellite and terrestrial coverage with reception quality determined by the service providers, and each vehicle subscribing to the digital service generally includes a digital radio having a receiver and one or more antennas for receiving the digital broadcast.

GPS antennas have a broad hemispherical coverage with a maximum antenna gain at the zenith (i.e. hemispherical coverage includes signals from 0° elevation at the earth's surface to signals from 90° elevation up at the sky). Emergency systems that utilize GPS, such as OnStar™, tend to have more stringent antenna specifications. For example, GPS antennas for emergency systems are usually located on large ground planes to improve signal reception performance. In the case of GPS antennas mounted on vehicles, the rooftop of the vehicle becomes the ground plane that provides improved antenna performance, and therefore, is the best receiving location.

However, unlike GPS antennas which track multiple satellites at a given time, SDARS antennas are operated at higher frequency bands and presently track only two satellites at a time. Thus, the mounting location for SDARS antennas make antenna reception a sensitive issue with respect to the position of the antenna on the vehicle. As a result, SDARS antennas are typically mounted exterior to the vehicle, usually on the roof of the vehicle, which presents major difficulties for vehicle manufacturers, causing design changes in the vehicle manufacturing process.

A number of other antenna systems have also been proposed that provide for the reception of radio frequency (RF) signals on vehicles, V. FIG. 1 illustrates a known antenna system, which is seen generally at 1, that allows transfer of RF energy across a dielectric, such as glass, for reception of any desirable wireless signal, such as AM/FM, SDARS, GPS, DAB, or PCS/AMPS signals. The antenna system 1 is an externally-mounted system and obviates the undesirable practice of having to drill installation holes through the windshield or window of an automotive vehicle, V. Typically, when such installation holes are drilled, a proper seal would have to be provided to protect the interior of the vehicle, V, and its occupants from exposure to external weather conditions. Although not illustrated, it is known to mount SDARS antennas on the trunk or rear fender portion of the vehicle as well via the installation hole process or through other magnetically coupling means. The installation of such antennas is difficult for high volume vehicle producers, as special vehicle roofs and installation processes have to be employed. Without disturbing the vehicle roof structure, antennas can be mounted magnetically on the roof, but the cables coming out of the antenna unit have to enter the vehicle's interior through a windshield-roof gasket, backlite-roof gasket, or some other passage.

To avoid mounting antenna systems on the vehicle's exterior, the antennas can also be mounted inside the instrument panel (IP) of the vehicle. Although IP-mount antennas suffer considerable performance degradation (e.g. as a result of surrounding medium interference, such as structural cross-car beams and other electronics, and overhead interference from the roof) compared to rooftop-mount configurations, IP-mount antennas are often preferred due to their hidden and aesthetically-pleasing location inside the vehicle. Even further, studies have shown that hidden inside-vehicle-mount SDARS antennas exhibit poor satellite and terrestrial reception qualities. However, although it is known that performance of the antenna suffers, vehicle manufacturers and vehicle owners favor hidden antennas for their ease of installation and aesthetically pleasant appearance, respectively.

Accordingly, it is therefore desirable to provide an improved antenna assembly that has reduced signal interference, improved antenna performance, is aesthetically pleasing, and easy to install.

SUMMARY OF THE INVENTION

The present invention relates to an antenna assembly. Accordingly, one embodiment of the invention is directed to an antenna assembly located in an externally-located vehicular mirror housing. The externally-located vehicular mirror housing includes a cable exit passage. The antenna assembly includes at least one antenna element mounted on a circuit board. The cable exit passage passes an antenna cable extending from the circuit board and into the vehicle cabin.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
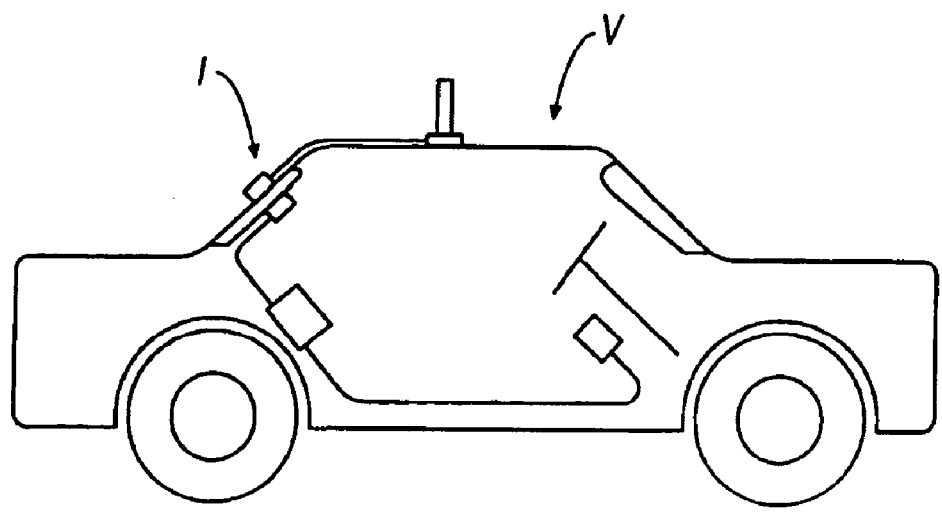
FIG. 1 illustrates a known, externally-mounted antenna system.
Figure 2:
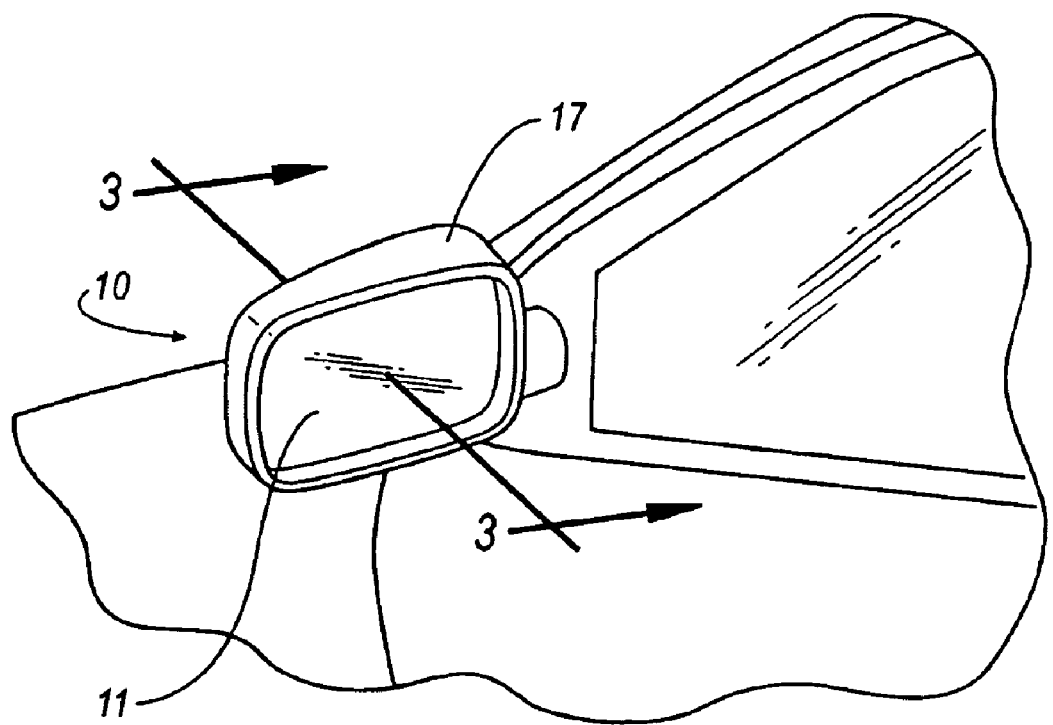
FIG. 2 illustrates an externally-mounted antenna system according to one embodiment of the invention.

Referring generally to FIGS. 2 and 3A-3C, the above described disadvantages are overcome and a number of advantages are realized by an externally-mounted driver and/or passenger mirror housing 10 including a mirror 11, a mirror-positioning step motor 13, a cable exit passage 15, and an antenna assembly, which is generally illustrated at 10a, 10b, and 10c. The driver and/or passenger mirror housing 10 generally comprises a plastic cover 17. The cable exit passage 15, which is typically utilized for passing a cable that controls the rotation and heating functions of the mirror, may also be utilized for antenna cables 16 so that the overall physical structure of the driver and/or passenger mirror housing 10 remains same to the original design scheme prior to the implementation of the antenna assembly 10a, 10b, 10c.

Figure 3A:
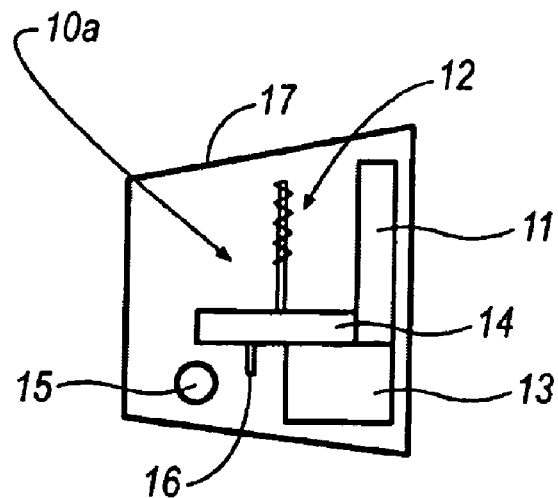
FIG. 3A illustrates a partially broken cross-sectional view of an externally-mounted mirror housing antenna assembly taken along 3-3 of FIG. 2.
Figure 3B:
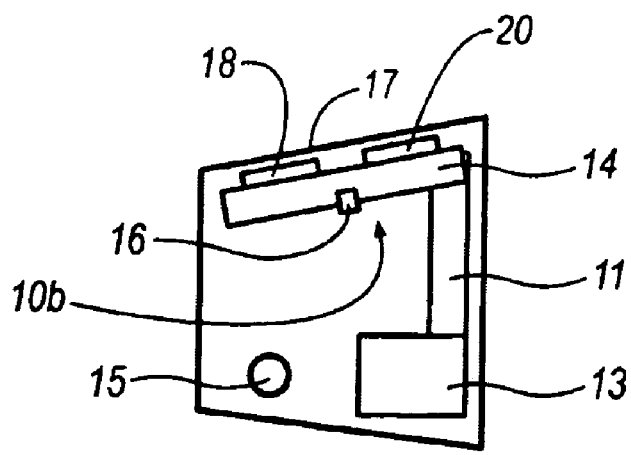
FIG. 3B illustrates a partially broken cross-sectional view of an externally-mounted mirror housing antenna assembly taken along 3-3 of FIG. 2.
Figure 3C:
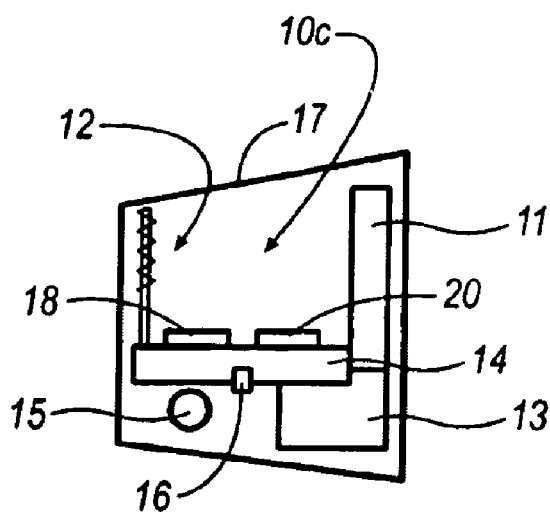
FIG. 3C illustrates a partially broken cross-sectional view of an externally-mounted mirror housing antenna assembly taken along 3-3 of FIG. 2.

Accordingly, most antennas that operate between the 800 MHz to 5.8 GHz range may be included within the driver and/or passenger mirror housing 10. For example, AMPS operates on the 824-849 and 869-894 MHz bands, DAB operates on the 1452-1492 MHz band, commercial GPS operates around 1574 MHz (L1 Band) and 1227 MHz (L2 Band), PCS operates on the 1850-1910 and 1930-1990 MHz bands, and SDARS operates on the 2.32-2.345 GHz band. However, AM/FM, which operates on the 540-1700 kHz and 88.1-107.9 MHz bands, and other similar antennas that operate on other lower frequencies may be included in the design as well. As seen in FIGS. 3A-3C, each antenna assembly 10a, 10b, 10c, includes at least one radiating element, such as, for example, a PCS/AMPS antenna 12 (FIGS. 3A and 3C), a GPS patch antenna 18 (FIGS. 3B and 3C), an SDARS patch antenna 20 (FIGS. 3B and 3C), and associated immediate active circuitry (not shown) while being able to obtain satisfactory reception and/or transmission performance. Each antenna assembly 10a, 10b, 10c also includes a cable 16 that is attached to the antenna 12, 18, 20, which extends from the circuit board 14, and into the vehicle cabin from the externally-located driver and/or passenger mirror housing 10.

Functionally, antennas employed for SDARS and GPS applications are receiving-only antennas that typically encounter weak satellite signal reception (i.e. by the time the satellite signal reaches the earth's surface, the received signal is weak). To compensate for the weakened signal reception, the antennas typically employ a known active microwave circuit, such as a low noise amplifier (LNA) that is located inside the circuit board 14, to amplify the received weak signal to a much stronger level so that it can be further processed with the receiver/navigation system. Antennas employed for analog and digital telephones bands PCS/AMPS applications, on the other hand, are used for both earth-based-transmitting (i.e. uplink frequencies) and earth-based-receiving (i.e. downlink frequencies) purposes, and therefore do not need an active microwave circuit for immediate amplification. At their transmitting mode, PCS/AMPS antennas are required to emit low electromagnetic energy to the people inside the vehicle so as not to cause any harm to lining tissues. To comply with the specific absorption rate (SAR) standards determined by the Federal Communications Commission (FCC), these antennas are mounted exterior to the vehicle so that radiation to the interior cabin of the vehicle is minimized.

The bandwidth of conventional inside-vehicle antennas tend to become narrower due to the loss and loading of backlite and windshield glasses. For this reason, the antennas are more prone to small changes in their physical characteristics, such as antenna height and mounting location, due to electromagnetic interaction of the antenna and glass. Accordingly, these drawbacks can be minimized when the antennas 12, 18, 20 are mounted inside the driver and/or passenger mirror housing 10 because the antennas 12, 18, 20 are away from the vehicle body and glass so that wave interaction is minimized. Additionally, the antenna assemblies 10a, 10b, 10c provide a hidden system that is aesthetically pleasing while providing optimum signal reception performance and meeting operational requirements set by the service providers.

Referring specifically to FIG. 3A, an antenna assembly dedicated to AMPS/PCS and other wireless communication antennas operating between 2.4 GHz and 5.8 GHz is generally shown at 10a. The antenna assembly comprises a wire antenna 12, such as normal mode helical or inductively loaded monopole, that is designed to operate at both AMPS and PCS frequency bands. Alternatively, the antenna 12 may be a loop antenna or a microstripline antenna printed on a circuit board. The height of the antenna 12 is small enough to be placed vertically inside the driver and/or passenger mirror housing 10, and can be easily shielded from driver/passenger side glass so that the emission from the antenna 12 to the vehicle occupants is minimized. The height of the antenna 12 may be any desirable height, such as for example, approximately equal to 67 mm. Although a wire antenna 12 is illustrated in FIG. 3A, it is contemplated that other antennas, such as patch antennas, may be implemented in place of the wire antenna 12 for reception of AMPS and PCS.

Referring specifically to FIG. 3B, an antenna assembly dedicated to GPS and SDARS is generally shown at 10b. The antenna assembly 10b comprises a GPS patch antenna 18 (i.e. a right-hand circular polarization (RHCP)). The antenna assembly 10b also comprises another patch antenna 20 dedicated to SDARS (i.e. a left hand circular polarization (LHCP)). Although two patch antennas 18, 20 are shown, it is contemplated that the antenna assembly 10b may include one patch antenna to receive GPS or SDARS signals. In either embodiment, patch antennas 18, 20 are the smallest in size as compared to other antennas, having dimensions approximately equal to 5-6 mm in height and 15 mm-square in surface area. Even further, although patch antennas 18, 20 are illustrated in FIG. 3B, it is contemplated that other antennas, such as a helical antenna, may be implemented in place of the patch antennas 18, 20 to function in the reception of either GPS or SDARS signals. Also referring to FIG. 3C, a combinational antenna assembly dedicated to AMPS/PCS, GPS, and SDARS is generally shown at 10c. The antenna assembly 10c incorporates all of the antennas 12, 18, 20 discussed above into one driver and/or passenger mirror housing 10.

Accordingly, the driver and/or passenger mirror housing 10 provides an ideal location to mount the aforementioned types of antenna assemblies 10a, 10b, 10c.

Figure 4B:
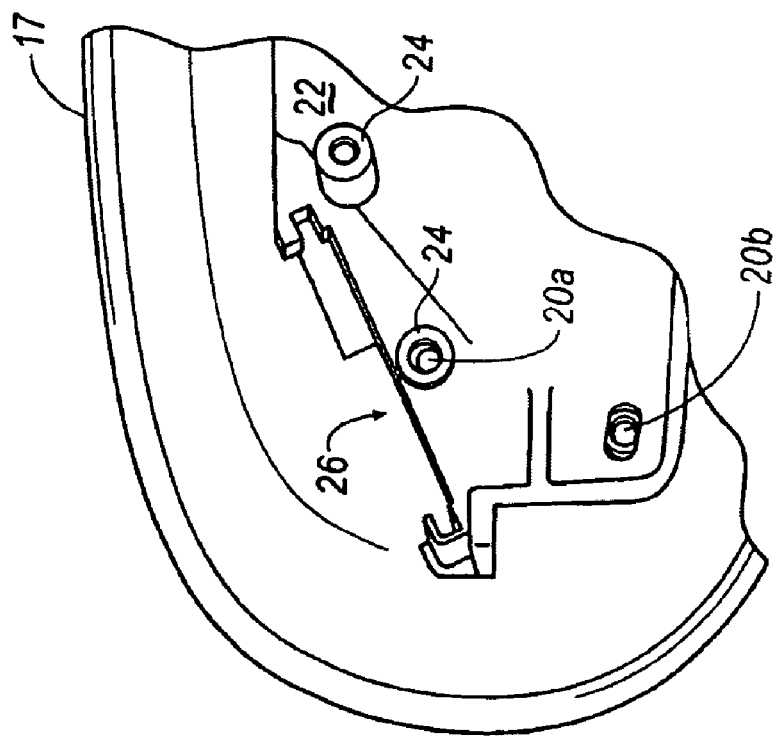
FIG. 4B illustrates another front perspective view of a partially assembled mirror housing for externally mounting an antenna according to FIG. 4A.
Figure 4A:
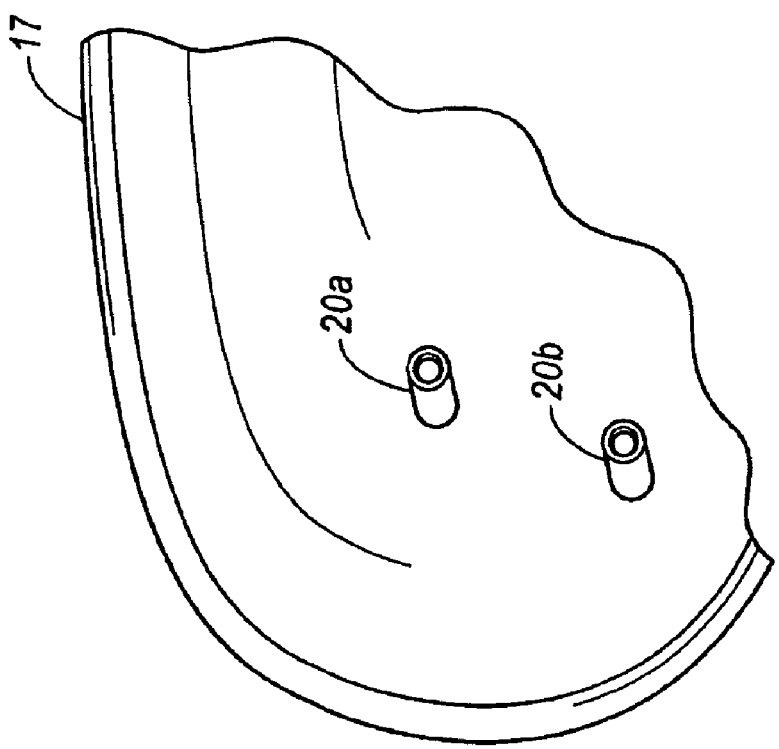
FIG. 4A illustrates a front perspective view of a partially assembled mirror housing for externally mounting an antenna according to one embodiment of the invention.
Figure 4C:
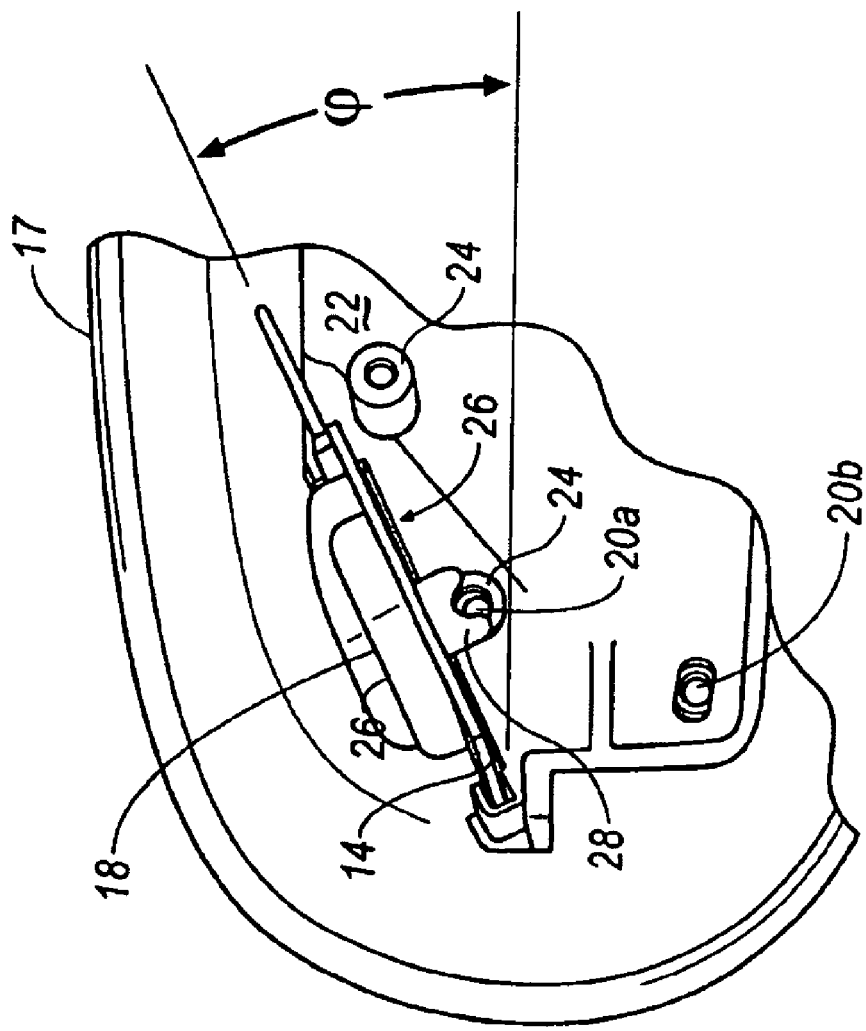
FIG. 4C illustrates another front perspective view of a partially assembled mirror housing for externally mounting an antenna according to FIG. 4B.

A detailed view of a mounting design for the plastic cover 17 is seen in FIGS. 4A-4C according to one embodiment of the invention. The plastic cover 17 includes integrally-molded mounting bosses 20a, 20b (FIG. 4A) that receives a mirror frame 22 (FIGS. 4B and 4C). The mirror frame 22 includes mirror mounting bosses 24 and a mounting slot 26 that is adaptable to receive the circuit board 14 with an associated antenna, such as, for example, patch antenna 18. The clearance of the mounting slot 26 is preferably designed to have a clearance large enough to receive, frictionally engage, and retain the circuit board 14. To supplement the retention of the circuit board 14, a lip portion 28 extending from the circuit board 14 is located about the mounting boss 20a such that the lip portion 28 is adjacently flush with the mirror frame 22 so that a mounting screw or other fastener (not shown) may secure and retain the circuit board 14 to the mirror frame 22. As seen in FIG. 4C, the circuit board 14 and antenna 18 is mounted at an elevation angle, $\phi$. The elevation angle, $\phi$, may be an desirable angle for improved antenna performance, and may range approximately from 10° to 40°.

Figure 5:
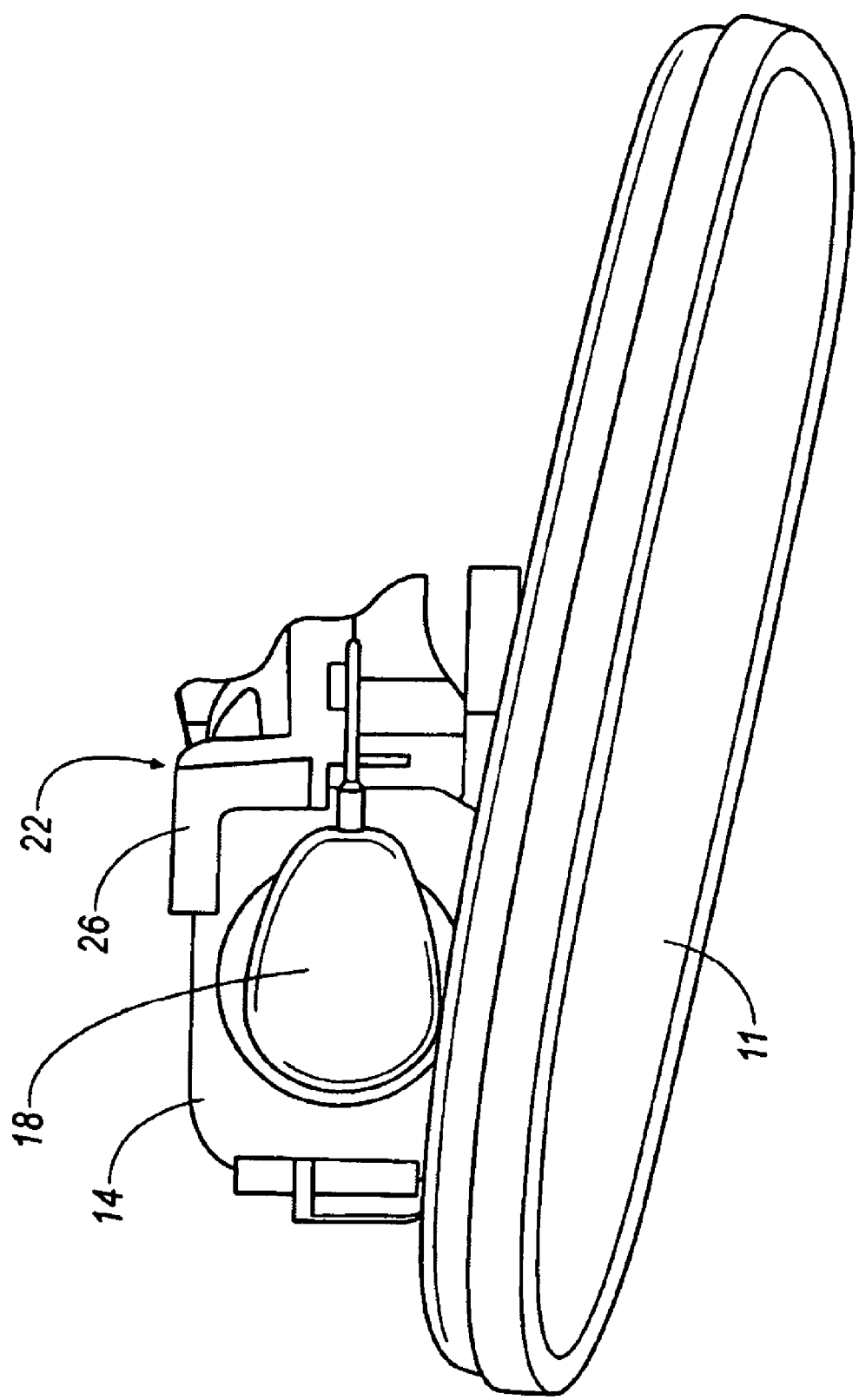
FIG. 5 illustrates a top perspective view of a partially assembled mirror housing for externally mounting an antenna according to FIGS. 4A-4C.

As seen in FIG. 5, the patch antenna 18 is located on the circuit board 14 such that a minimum clearance to the plastic cover (not shown) is provided. For example, according to one embodiment of the invention a minimum clearance of at least 5 mm is provided. When the mirror travels at a maximum 10° travel about a pivot axis (not shown), a minimum clearance of the circuit board 14 and patch antenna 18 is also provided. For example, according to one embodiment of the invention, a minimum clearance of at least 3 mm is provided. Minimal clearances increase antenna performance, however, clearances of the circuit board 14 and patch antenna 18 from the mirror 11 and plastic cover protect that antenna assembly from vibrational damage that may occur. Although a driver-side plastic cover 17 discussed in relation to FIGS. 4A-5 includes integrally-formed mounting bosses 20a, 20b formed on the mirror frame 22, it is contemplated that the mirror frame 22 and/or card slot 26 may be integrally molded with the plastic cover 17 to reduce the number of parts, cost, and installation time of the assembly.

Figure 6:
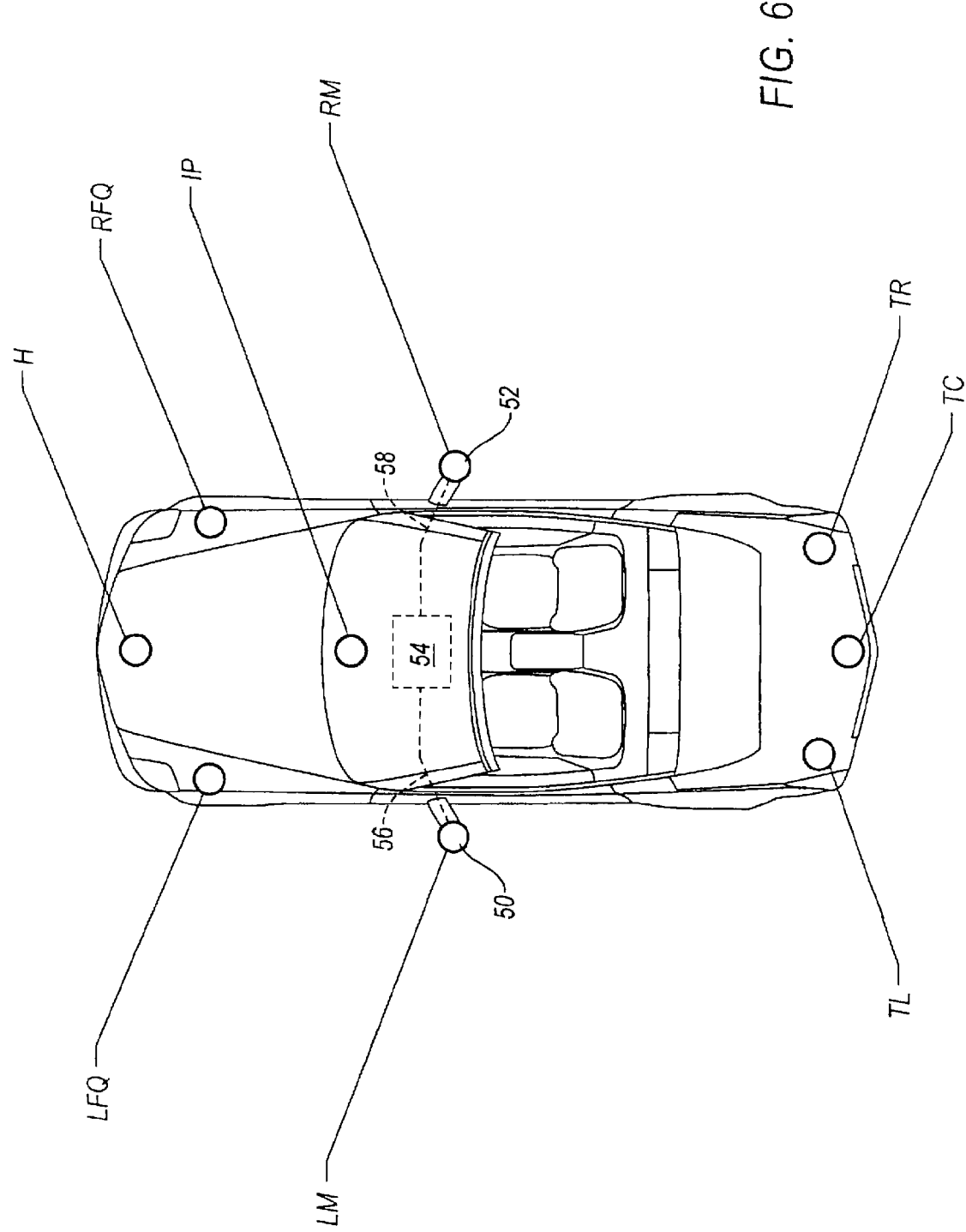
FIG. 6 illustrates diversity antenna configurations according to one embodiment of the invention.

The patch antennas 18, 20 may also operate as part of a diversity antenna application such that one or more complementary patch antennas 18, 20 are positioned in both driver and passenger mirror housings 10 on each side of the vehicle to cover the expected satellite signal from one or more satellites. The positioning of the patch antennas 18, 20 in a diversity application increases the probability of uninterrupted reception of the satellite signals when physical obstructions, such as tall buildings or trees impede the line of sight (LOS) of at least one of the patch antennas 18, 20. As seen in FIG. 6, a diversity antenna application may be applied using any desirable antenna placement configuration. For example, antennas may be located under the trunk lid in a center location (TC), left, driver-side location (TL), a right, passenger-side location (TR), or, at a hood location (H), a left, driver-side front quarter panel location (LFQ), a right, passenger-side front quarter panel location (RFQ), an instrument panel location (IP), an left, driver-side mirror location (LM), or a right, passenger-side mirror location (RM).

Although gain performance of LM and RM antennas is acceptable, the performance of the antennas is greatly improved upon in a diversity application when two antennas 50 and 52 are incorporated in an antenna system which are interconnected by an audio radio 54 by cables 56 and 58, respectively. Test results show evidence that antenna performance in a diversity application is maximized when antennas are mounted in the left driver-side mirror housing LM and right passenger-side mirror housing RM. Additionally, antenna performance is also maximized when at least one mirror-housed antenna is implemented, however, antenna performance is not maximized in comparison to the driver- and passenger-side mirror-housed antenna diversity configuration. Although antenna performance may be improved upon in non-mirror-housed diversity applications, antenna performance is adequate when one antenna is positioned in the mirror housing, such that it may not be necessary to implement two antennas in a non-mirror-housed diversity application. Thus, positioning a single antenna within a mirror-housing, or, by positioning at least one antenna in a mirror-housed diversity antenna configuration greatly improves antenna performance.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A diversity antenna system for an automotive vehicle audio system, said diversity antenna system, comprising:
   a mirror housing located externally on a first portion of an said automotive vehicle, said housing including a cable exit passage;
   a first antenna assembly including at least one antenna element fixedly mounted on a circuit board, wherein the antenna assembly is fixedly located within the externally-located vehicular mirror housing, wherein the cable exit passage passes an antenna cable extending from the circuit board and into the vehicle cabin; and
   a second antenna assembly including at least one antenna element fixedly mounted on a circuit board, wherein the second antenna assembly is fixedly located on a second portion of said vehicle, said first and second antenna assemblies operatively coupled to a common signal receiving device, wherein the common signal receiving device is a satellite audio radio receiver disposed within said vehicle cabin.

2. The antenna system according to claim 1, wherein externally located vehicle mirror housing generally comprises a plastic material.

3. The antenna system according to claim 1, wherein the at least one antenna element is a dielectric or wire antenna.

4. The antenna system according to claim 1 further comprising a low noise amplifier located inside a circuit board.

5. The antenna system according to claim 1, wherein the at least one antenna element is a patch antenna element.

6. The antenna system according to claim 5, wherein the patch antenna receives SDARS frequencies.

7. The antenna system according to claim 5, wherein the patch antenna receives GPS frequencies.

8. The antenna system according to claim 5, wherein a complementary pair of patch antennas are each located in driver- and passenger-side vehicular mirror housings so as to operate as part of a diversity antenna application to provide uninterrupted reception of the satellite signals.

9. The antenna system according to claim 1, wherein the mirror housing further comprising at least one mounting boss that retains a mirror frame.

10. The antenna system according to claim 9, wherein the mirror frame comprises a circuit board retaining portion that maintains the circuit board at an elevation angle.

11. The antenna system according to claim 9, wherein the circuit board includes a lip portion positioned adjacent the mirror frame and, said mirror housing defines at least one mounting boss aligned with said lip portion to fixedly retain the circuit board and mirror frame to the mirror housing.

12. The antenna system according to claim 11, receives and transmits PCS/AMPS, RKE, TPM, and AM/FM frequencies.

13. The antenna system according to claim 1, wherein the at least one antenna element is selected from the group consisting of a normal mode helical antenna, an inductively loaded monopole antenna, a loop antenna, and a microstripline antenna printed on a circuit board.

14. A diversity antenna system for an automotive vehicle audio system, said diversity antenna system comprising:

a first antenna assembly including at least one first antenna element fixedly mounted on a circuit board, wherein the antenna assembly is fixedly disposed within a mirror housing located externally on a first portion of an associated vehicle;

a second antenna assembly including at least one second antenna element fixedly mounted on a circuit board, wherein the second antenna assembly fixedly disposed on a second portion of said vehicle distal said first antenna assembly; and cable means operatively coupling said first and second antenna assemblies to a common signal receiving device, wherein the common signal receiving device is a satellite audio radio receiver disposed within said vehicle.

* * * * *